United States Patent [19]

Freudenberg

[11] Patent Number: 5,121,904
[45] Date of Patent: Jun. 16, 1992

[54] HYDRAULICALLY DAMPED RUBBER BEARING HAVING A RELIEF SPRING

[75] Inventor: Tillman Freudenberg, Weinheim, Fed. Rep. of Germany

[73] Assignee: Firma Carl Freudenberg, Weinheim/Bergstr., Fed. Rep. of Germany

[21] Appl. No.: 663,295

[22] Filed: Feb. 28, 1991

Related U.S. Application Data

[63] Continuation of Ser. No. 411,391, Sep. 22, 1989, abandoned.

[30] Foreign Application Priority Data

Sep. 30, 1988 [DE]  Fed. Rep. of Germany ....... 3833182

[51] Int. Cl.$^5$ ............................ F16F 3/10; F16F 13/00
[52] U.S. Cl. ................. 267/140.1 A; 180/312; 248/563; 248/636; 267/140.4; 267/152
[58] Field of Search ................ 267/30, 33, 140.1 R, 267/140.1 A, 152, 219, 225, 140.4; 180/300, 312, 902; 248/562, 563, 634, 636, 621; 280/697

[56] References Cited

U.S. PATENT DOCUMENTS

| | | |
|---|---|---|
| 2,274,227 | 2/1942 | Willard ................. 267/225 |
| 2,457,058 | 12/1948 | Markowitz . |
| 2,510,963 | 6/1950 | Dibblee .............. 267/140.4 |
| 2,567,469 | 9/1951 | Borgeaud et al. . |
| 2,660,387 | 11/1953 | Roy . |
| 2,660,423 | 11/1953 | Roy . |
| 2,902,273 | 9/1959 | Hohenner . |
| 3,052,435 | 9/1962 | Roller . |
| 3,165,306 | 1/1965 | Tea .................. 267/225 X |
| 3,270,998 | 9/1966 | Keetch . |
| 3,814,412 | 6/1974 | Britton et al. . |
| 3,873,079 | 3/1975 | Kuus . |
| 3,874,646 | 4/1975 | Vernier . |
| 3,883,101 | 5/1975 | Vernier ............ 267/140.4 X |
| 3,947,007 | 3/1976 | Pelat ............... 267/140.1 A |
| 4,005,858 | 2/1977 | Lochner . |
| 4,630,807 | 12/1986 | Gaudiau . |
| 4,738,436 | 4/1988 | Loggers . |
| 4,757,982 | 7/1988 | Andrä et al. . |
| 4,801,019 | 1/1989 | Smolen .............. 267/227 X |
| 4,905,955 | 3/1990 | Brizzolesi et al. ..... 267/140.1 A X |
| 4,907,786 | 3/1990 | Okazaki et al. ........ 267/140.1 |
| 4,997,169 | 3/1991 | Nakamura et al. ..... 248/562 X |

FOREIGN PATENT DOCUMENTS

| | | |
|---|---|---|
| 187188 | 7/1986 | European Pat. Off. ...... 267/140.1 A |
| 3019337 | 11/1981 | Fed. Rep. of Germany . |
| 3239787 | 9/1983 | Fed. Rep. of Germany ... 267/140.1 A |
| 208654 | 10/1985 | Japan .................. 267/140.1 A |

Primary Examiner—George E. A. Halvosa
Attorney, Agent, or Firm—Kenyon & Kenyon

[57] ABSTRACT

A hydraulically damped rubber bearing includes a journal bearing, a bearing member and an annular spring element of elastic material forming a bearing spring having a perpendicular axis of deformation. The bearing spring is disposed between the journal bearing and the bearing member. A fluid-filled working chamber is surrounded by the journal bearing, bearing member and bearing spring. A compensation chamber is connected in fluid communication with the working chamber via a damping port. At least one relief spring is formed of a substantially non-creeping and/or non-settling material. The relief spring is connected in parallel with the bearing spring to support the journal bearing on the bearing member when the rubber bearing is load.

11 Claims, 8 Drawing Sheets

HYDRAULICALLY DAMPED RUBBER BEARING HAVING A RELIEF SPRING

This application is a continuation of application Ser. No. 07/411,391, filed Sep. 22, 1989, now abandoned.

BACKGROUND OF THE INVENTION

The invention relates to rubber bearings and, more particularly, to an improved hydraulically damped rubber bearing.

In DE-PS 3019337 a hydraulically damped rubber bearing is disclosed that includes a journal bearing, a bearing member and an annular spring element of elastic material forming a bearing spring having a perpendicular axis of deformation. The bearing spring is disposed between the journal bearing and the bearing member. A fluid-filled working chamber is surrounded by the journal bearing, the bearing member and the bearing spring. A compensating chamber is in fluid communication with the working chamber via a damping port connected therebetween. These type of rubber bearings are especially used in the bearing or support arrangement for internal combustion engines in motor vehicles. Newer versions of these types of bearings have working properties that are well-matched to the structural conditions of this tYpe of application. These properties result in good insulation of the high frequency, small amplitude oscillations that are produced during operation of the engine and good damping of the low frequency, large amplitude deflections of the engine caused by driving over uneven ground The good operating performance of the known rubber bearings of the type discussed above, unfortunately, is of short duration only and is soon lost, when the bearing is used in warmer climatic zones.

SUMMARY OF THE INVENTION

One of the problems to which the invention is directed is the improvement of rubber bearings of this type so that the operating performance is maintained for long periods of time and even in hot climates. In this manner, good insulation of the engine excited, high frequency, small amplitude oscillations can be guaranteed for the entire service life.

The invention solves this problem by providing a hydraulically damped rubber bearing comprising a journal bearing, a bearing member and an annular spring element of elastic material forming a bearing spring having a perpendicular axis of deformation. The bearing spring is disposed between the journal bearing and the bearing member. A fluid-filled working chamber is surrounded by the journal bearing, bearing member and bearing spring. A compensation chamber is in fluid communication with the working chamber via a damping port. At least one relief spring is formed of a substantially non-creeping or non-settling material and is connected in parallel with the bearing spring to support the journal bearing on the bearing member when the rubber bearing is loaded.

When the rubber bearing of invention is loaded, the journal bearing is supported on the bearing member by the relief spring, which, as noted above, is connected in parallel to the bearing spring, i.e., in the loaded condition it also transmits forces between the journal bearing and the bearing member. The relief spring, which is made of a substantially non-creeping and/or non-settling material, thereby relieves the bearing spring. The creeping and/or settling of the rubber or elastic material from which the bearing spring is made thus is counteracted and the resilient properties of the bearing spring are improved because they remain constant over longer time periods, even when the rubber bearing is used in hot climatic zones. Hence, a corresponding improvement in the constancy of the working properties of the rubber bearing of the invention is achieved during its service life.

The beneficial effects of the relief spring become more apparent when the relief spring is designed to carry a noticeable portion of the total static load to be borne by the rubber bearing. From this standpoint, it has proven advantageous to design the load-carrying capacity of the relief spring to be at least as great as that of the bearing spring.

The relief spring and the bearing spring may be positioned in such a way that, after the static load to be borne is applied to the journal bearing, the bearing spring is essentially free of strain. In such a case, the bearing spring can have an especially flexible construction to fulfill the requirement for good insulation of the engine excited, high frequency oscillations while at the same time ensuring that adequate damping of low frequency oscillations is provided.

The relief spring may be formed from a metal, which provides an especiallY good resistance to any manifestation of relaxation. Fiber reinforced synthetic resins also may be used to manufacture the relief spring. When formed of this type of material, the relief spring can be made lighter and achieve the same load-carrying capacity.

The relief spring may have disk-like annular shape and may be arranged between the heat source and the bearing spring. This design is especially simple to manufacture and shields the rubber bearing from the effect of heat rays. The outer shape of the disk-shaped spring is constructed to ensure adequate mobility of the journal bearing relative to the bearing member. A hollow conical shape will suffice for most applications.

In applications where the journal bearing is expected to move relative to the bearing member to a greater extent, it is advantageous, to provide the disk-shaped spring with cutouts distributed in the circumferential direction. The cutouts, which may emanate from the outer periphery and/or the inner circumference of the spring, completely extend through the profile of the disk-shaped spring in a direction parallel to the deformation axis of the bearing spring. With such a design, the circumferentially consecutive sections on both sides of the cutouts also have a good relative mobility in the circumferential direction. Any damage due to overloading thereby can be effectively prevented.

Starting from the outer and/or inner circumference of the disk-shaped spring, the cutouts may be formed in the profile of the spring tangentially or in a spiral-like manner to guarantee that total cohesion is maintained. When the individual consecutive sections between the cutouts form an acute angle with respect to the circumferential direction, the relief spring has a clearly increased spring length. The sections also may surround the deformation axis in a spiral-like fashion. The available spring excursion then is increased accordingly. To achieve more cost effective manufacturing, it is advantageous to design the cutouts to extend essentially radially.

Looked at from the static point of view, the circumferentially consecutive sections between these cutouts are expediently designed with a lateral section that increasingly diminishes in the salient area. Hence, a specific load will be as well balanced as possible over the entire length of the sections.

The disk-shaped relief spring may be fixed at one of its circumferential areas only, namely, at its inner circumferential area to the journal bearing or at its outer circumferential area to the bearing member. The spring is not fixed at its other circumferential area, but is supported for radial movement relative to the bearing member if it is fixed to the journal bearing, or to the journal bearing if it is fixed to the bearing member. In the course of normal operation, any straining and compressive stresses thereby are avoided during the stroke of the spring. It is also possible to provide the cutouts only in the circumferential area that is supported for radial movement.

To prevent high frequency oscillations and, in particular, sonic vibrations from being transmitted from the journal bearing through the relief spring to the bearing member, it is advantageous to provide a flexibly resilient insulator body, preferably made of rubber, between the movably-supported circumferential area of the disk-shaped spring and the part that it moves relative to, i.e., either the journal bearing or bearing member. This insulator body may be constructed integrally in one piece with the rubber material forming the bearing spring.

To prevent natural oscillations of the relief spring and/or of the bearing spring. It is advantageous, to provide at least one place of contact between the bearing spring and the relief spring in the middle range of their radial extents. It is especially advantageous to provide several places of contact, which may be formed by projections of the bearing spring and/or of the relief spring, circumferentially spaced from each other.

The relief spring may have a shape that allows for mounting on the rubber bearing in such a way that relative movements of the journal bearing in the perpendicular direction, which are caused by operating conditions, are absorbed while transverse and circumferential forces are not transmitted. Asymmetrically-shaped relief springs may be provided in a mirror-image arrangement, i.e., uniformly distributed in the circumferential direction.

The above-mentioned condition may be achieved by using a flat-shaped spring as the relief spring, especially if it is in the shape of a bridge. The ends of the flat spring are freely supported for relative movement, while the middle area of the spring is fixed to the journal bearing. The manufacturing and mounting process for this embodiment is especially simple.

The relief spring also may be designed as a hairpin spring. which makes it easier to attain especially long spring excursions. Spring excursions of similar magnitude can be attained by using spiral springs, which are more readily available and, therefore, considerably less expensive than hairpin springs.

Conically-shaped spiral springs also may be used as relief springs and have the additional advantage of being able to guide movement of the journal bearing relative to the bearing member. This prevents the journal bearing from being laterally deflected.

It is also possible to use helical springs as relief springs. These types of spring are proven in many technical areas and also are excellently suited to the present field of application.

When spiral springs, conical spiral springs or helical springs are used, it is possible to mount the springs concentric to the axis of deformation. In this case, however, circumferential forces can be produced during the course of normal operation. These forces can be prevented by providing interwound springs, i.e., springs with opposite windings in which one spring lies inside the other spring.

Instead of concentric mounting, it is also possible to provide at least two relief springs distributed uniformly in the circumferential direction of the rubber bearing. In this embodiment, the rubber bearing acts neutrally when oscillations are introduced to the journal bearing. Thus, no forces result in the transverse or circumferential direction, which would be superimposed to the perpendicular movements of the journal bearing.

To attain an especially small size, which is advantageous not only due to space considerations, but also for weight considerations as well, the relief spring may be formed as a compression spring. However, it is equally possible, of course, to develop it as a tension spring.

To prevent the rubber bearing of the invention from being strained in the transverse direction, which can occur as the result of an improper assembly, it is advantageous to support the journal bearing on the bearing spring by means of a push spring. The push spring may comprise a rubber or elastic material, preferably rubber, that is flexible and includes a portion disposed essentially diagonally to the axis of deformation of the journal bearing.

In principle, it is possible to arrange the relief spring inside the fluid-filled working chamber and, by this means, to prevent the development of natural oscillations. On the other hand, to provide for simple adaptability to loads of varying magnitude that must be borne, it is advantageous to arrange the relief spring outside of the working chamber and have it connected to the same in a detachable manner.

The advantages attained with the invention result in a better constancy of the properties of the bearing during the service life. Thus, the rubber bearing the invention guarantees a clearly improved insulation of high frequency oscillations for long periods of time and, particularly, for applications in hot climates.

Further features, advantages and embodiments of the invention are apparent from consideration of the following detailed description, drawings and appended claims.

DETAILED DESCRIPTION

Figure 1:
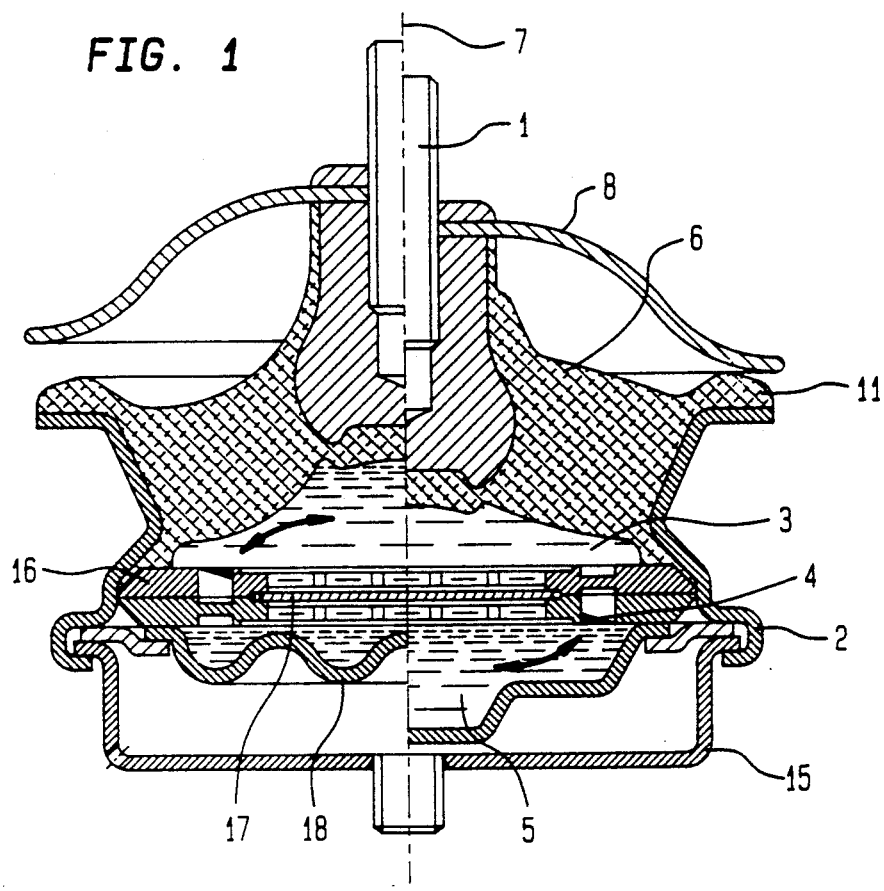
FIG. 1 and 2 illustrate, in longitudinal section and in plan, respectively, a rubber bearing constructed according to the principles of the invention in which the relief spring is designed as a disk-shaped spring.

The cross sectional views of the various rubber bearing illustrated portray the left section of the bearing in the unloaded condition and the right section in the loaded condition, i.e., the condition of the static load that it must bear during normal operation. The general construction of the rubber bearing of the invention is described as follows.

The rubber bearing comprises a journal bearing 1 and a bearing member 2, which may be formed of metallic materials and are connected by the bearing spring 6. Bearing spring 6 may be made from a suitable elastic material, such as rubber, which may form the bearing spring 6, for example, by means of direct premolding and prevulcanization of the rubber material. The bearing member 2 may comprise deep drawn sheet metal. At the lower portion of the cross sectional views shown, member 2 surrounds the radially outwardly projecting edge of a base section 15. This base section may have a cup shape and is provided, in the same manner as the journal bearing 1, with a threaded bolt so that it can be affixed to the machine parts to be connected by the bearing. At the same time, the bearing member 2 and the base section 15 enclose a two-part partition wall 16, which includes a spiral-shaped damping port 4 extending through radially outward, external areas of wall 16 and surrounding a thin disk 17 provided in the middle region of the wall 16. The thin disk 17 can move back and forth between lattice-shaped stop means provided on both sides of wall 16.

A compensating chamber 5 is defined between a flexible membrane 18 disposed in the interior of the base section 15 and the bottom side of the partition wall 16. The periphery of the membrane is surrounded by a metal part and sealingly retained in a liquid-tight manner in the bearing member 2.

A working chamber 3 is defined between rubber bearing 6 and the top side of wall 16. The working chamber 3, the port 4, which places the two chambers 3 and 5 in fluid communication, and the compensating chamber 5 are filled with a hydraulic fluid, preferably with a glycol and water mixture. The total available volume of fluid thereby is constant.

A relief spring 8 is attached to the journal bearing 1 and may be formed from a molded metallic component. The relief spring shown in FIG. 1 is shaped as a disk spring and formed in such a way that, in the relieved or unloaded state of the rubber bearing, the outer peripheral edge of the relief spring is axially spaced from a flexible insulating body 11 of the bearing member 2. Flexible insulating body 11, which also may be made of rubber or elastic material, is provided between the bearing member 2 and the disk spring to prevent high frequency oscillations from being directly transmitted from the journal bearing 1 to the bearing member 2. Although not shown in the drawings, the disk spring may comprise several individual springs, which may have different properties, that are combined to form a stack of springs.

After a load is applied under normal operating conditions, a mutual contact between the relief spring and bearing spring results in which the relief spring 8 is flexibly stressed. This causes the bearing spring 6 to be relieved by the same order of magnitude. The danger of any creeping or settling occurring in the rubber or elastic material forming the bearing spring 6 is reduced accordingly. Also, a better constancy of the working properties of the rubber bearing is guaranteed over long periods of time. This is especially true when the relief spring 8 is designed to carry a load that is at least as great as that designed for the bearing spring 6 and, accordingly, absorbs at least 50% of the static load. In this manner, the bearing spring 6 can have a more flexible construction, which means it can move more easily in response to high frequency changes of pressure in the working chamber 3. Corresponding oscillations of the journal bearing 1 thereby are kept away from the bearing member 2 more effectively, thus providing better insulation. In addition, when oscillations are introduced, a corresponding relative displacement of the small plate 17 between the lattice-stop means results. Any changes of pressure thereby are prevented, thus helping to achieve a good insulating effect.

On the other hand, when low frequency oscillations are introduced into the journal bearing 1, the liquid volume contained in the damping port 4, which has a canal-type construction, attains a resonant movement that is directed opposite the exciting oscillation. By this means, the oscillations undergo a high-grade damping.

The above-described, fundamental operation of the rubber bearing of the invention is applicable to the embodiments discussed below. The explanation of these embodiments therefore is limited to the different design of the relief springs depicted therein.

Figure 3:
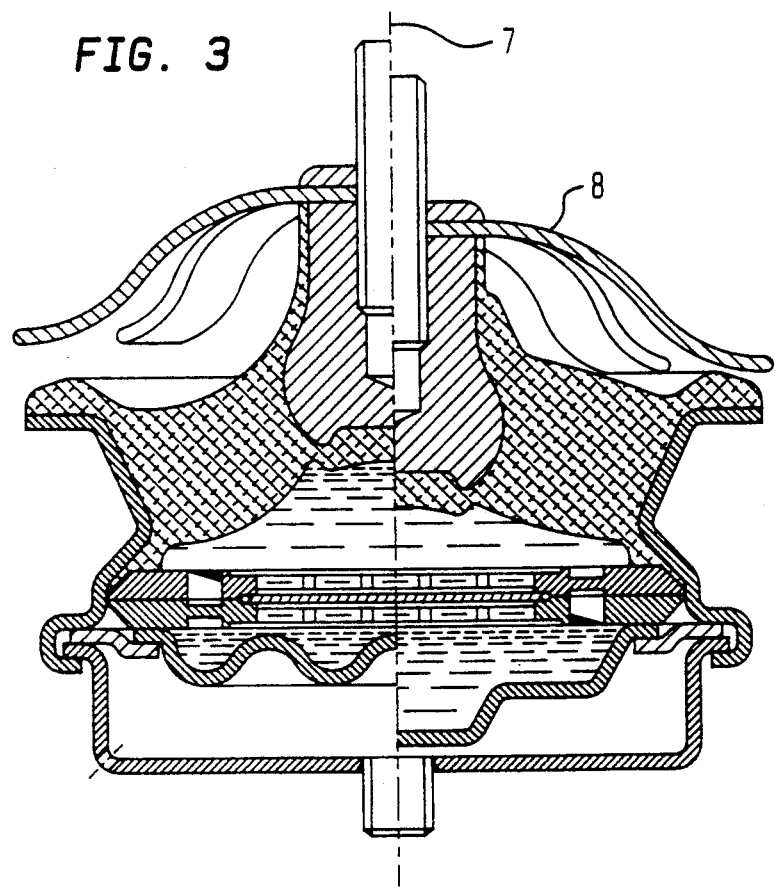
FIGS. 3 and 4 illustrate, in longitudinal section and in plan, respectively, an embodiment similar to that of FIGS. 1 and 2, in which the disk-shaped spring is provided with cutouts extending from the outer circumference of the spring.
Figure 4:
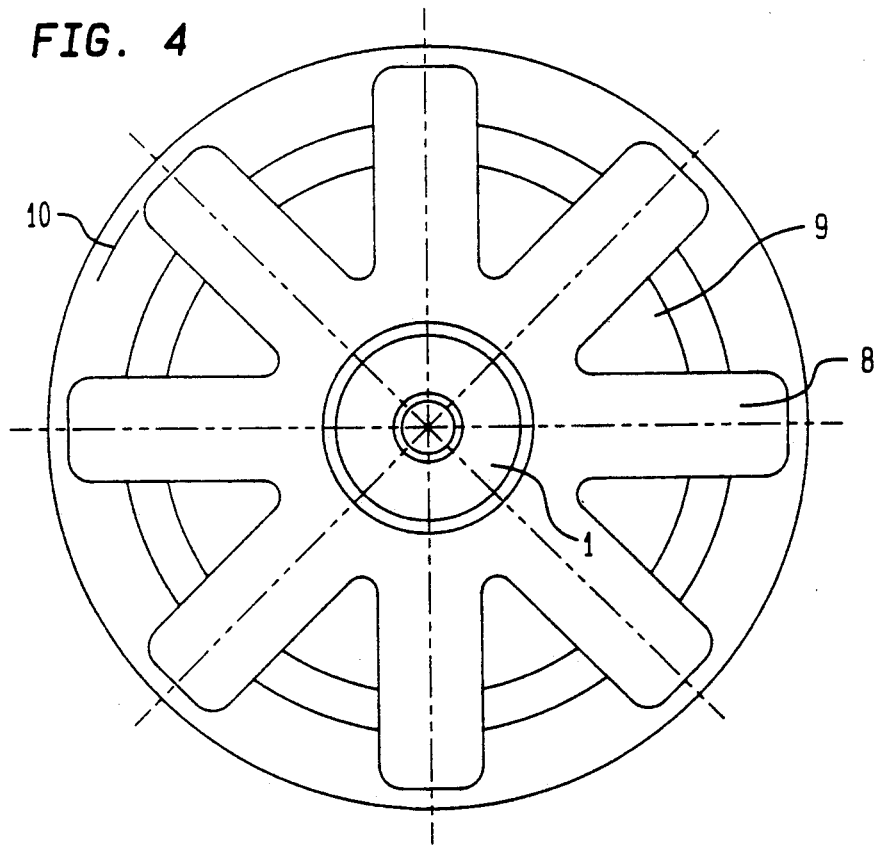

In the embodiment of FIGS. 3 and 4, the relief spring 8 also is shaped as a disk spring, but includes cutouts 9 uniformly distributed in the circumferential direction. The cutouts emanate from the outer circumference 10 and completely extend through the profile of the relief spring in a direction parallel to the deformation axis 7 of the bearing spring. In the radially outward direction, the extent of cutouts 9 increases in the circumferential direction. This evens out the specific cross sectional loading of the sections of the relief spring 8 situated between the cutouts 9, which loading results when oscillations are introduced into the journal bearing.

Figure 2:
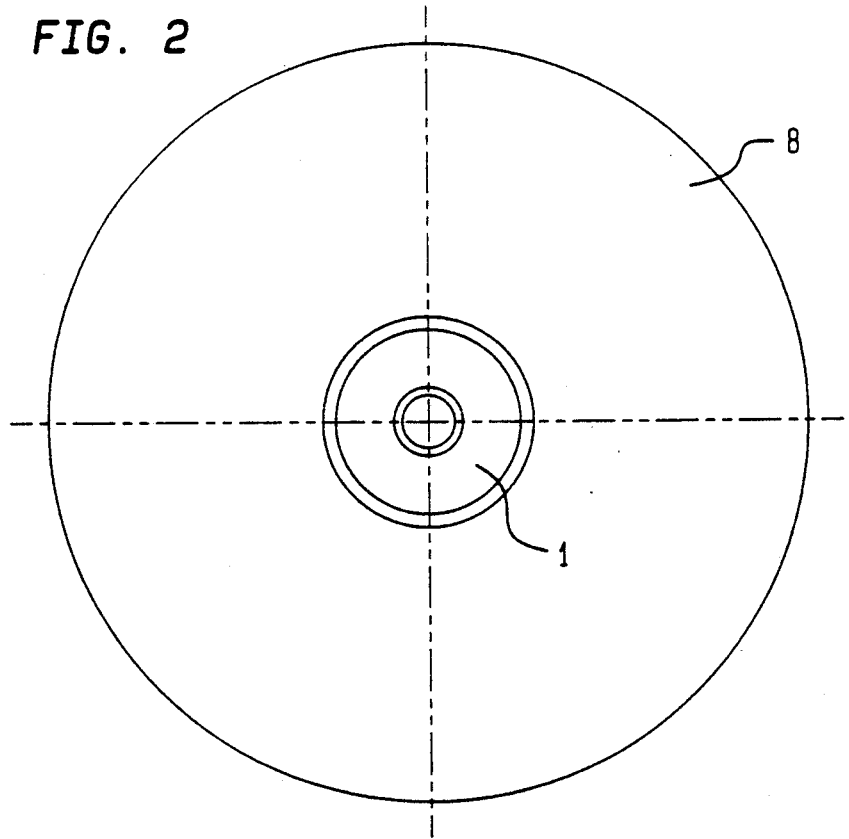
Figure 5:
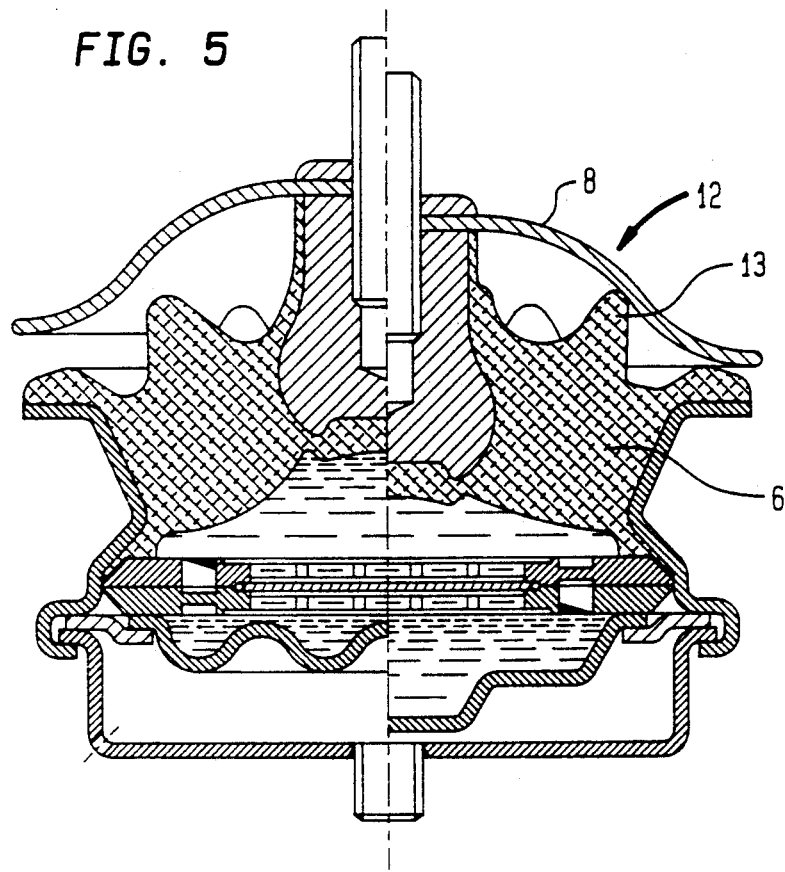
FIGS. 5 and 6 illustrate another embodiment similar to that of FIGS. 1 and 2 in which the bearing spring and the relief spring are in contact with each other in the middle area of their radial extent.
Figure 6:
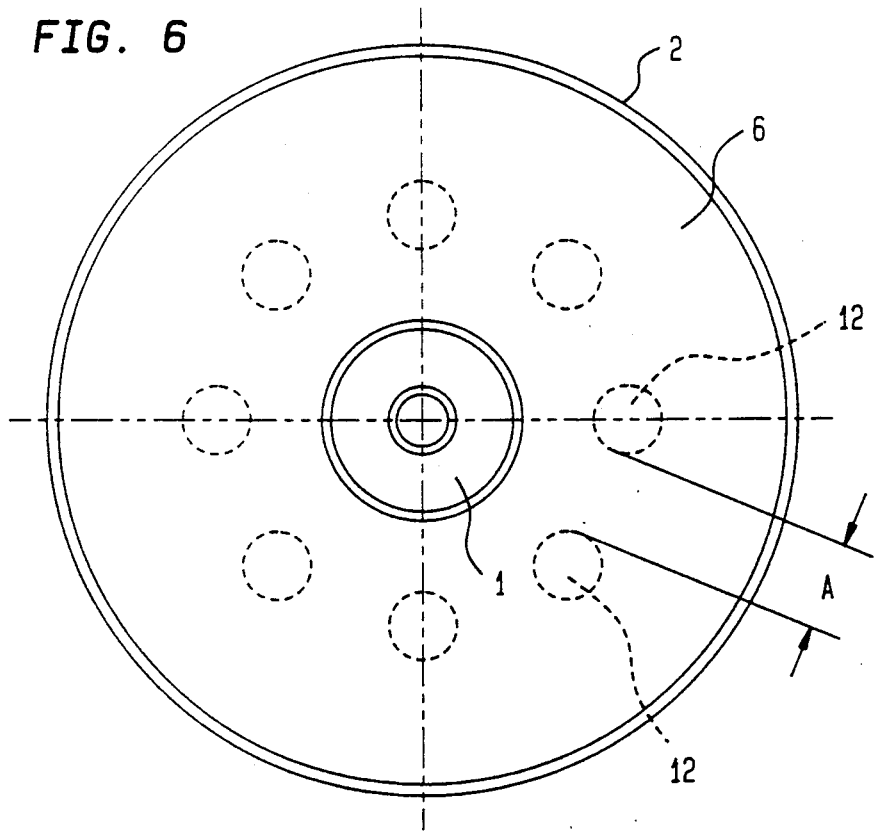

The embodiment of FIGS. 5 and 6 is constructed similar to that of FIGS. 1 and 2. However, additional places of contact 12 are provided between the bearing spring 6 and the relief spring 8 in the middle area of the radial extent of their profile. These places of contact are uniformly distributed in the circumferential direction and are equidistantly spaced apart at a circumferential clearance A. The contact places are formed by the outermost areas of projections 13, which may be tip-stretched in one piece from the bearing spring 6 When it is made of rubber. Also, during normal operational use, the contact places suppress natural oscillations of the relief spring 8 and the bearing spring 6.

Figure 7:
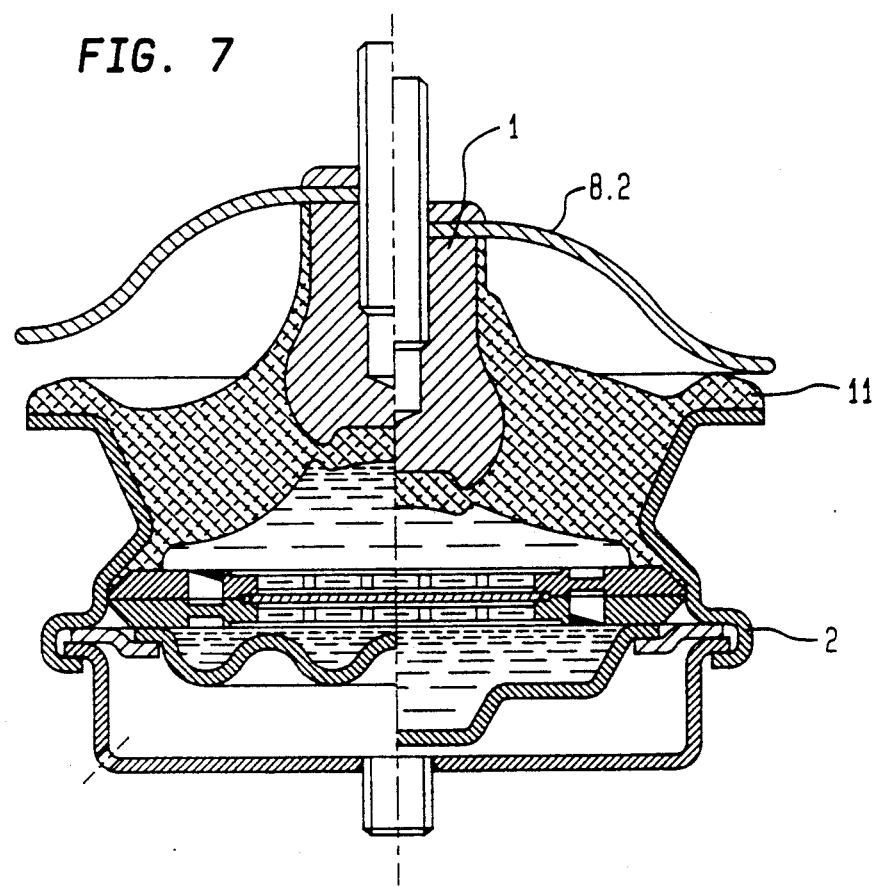
FIGS. 7 and 8 illustrate an embodiment similar to that of FIGS. 1 and 2 in which the relief spring is designed as a flat spring having a bridge-like shape.
Figure 8:
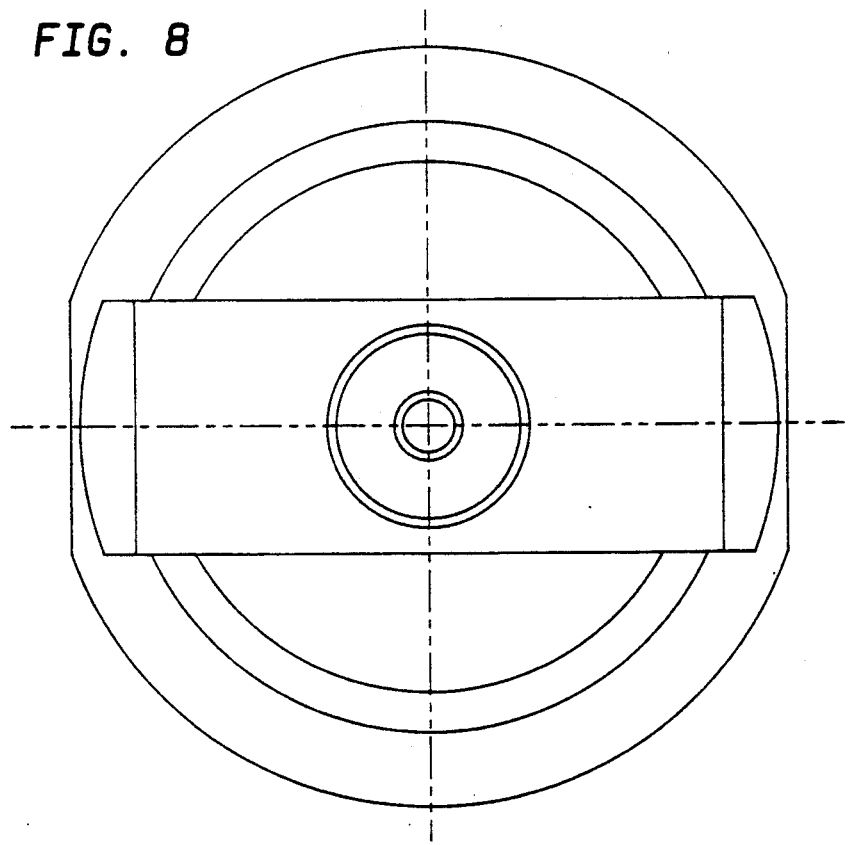

In the embodiment of FIGS. 7 and 8, the relief spring 8 comprises a flat spring 8.2 having a bridge-type shape, which is fixed at its middle region to the journal bearing 1. In the loaded state, the laterally projecting ends of the flat spring 8.2 contact the bearing member 2. Flexible insulating body 11 is provided between the bearing member 2 and the projecting ends of the flat spring 8.2 to prevent high frequency oscillations from being directly transmitted from journal bearing 1 to bearing member 2. In this case, similar to the disk spring embodiments, a stack-type formation of several flat springs may be provided. The individual springs contained in such a stack thereby may have different properties.

Figure 9:
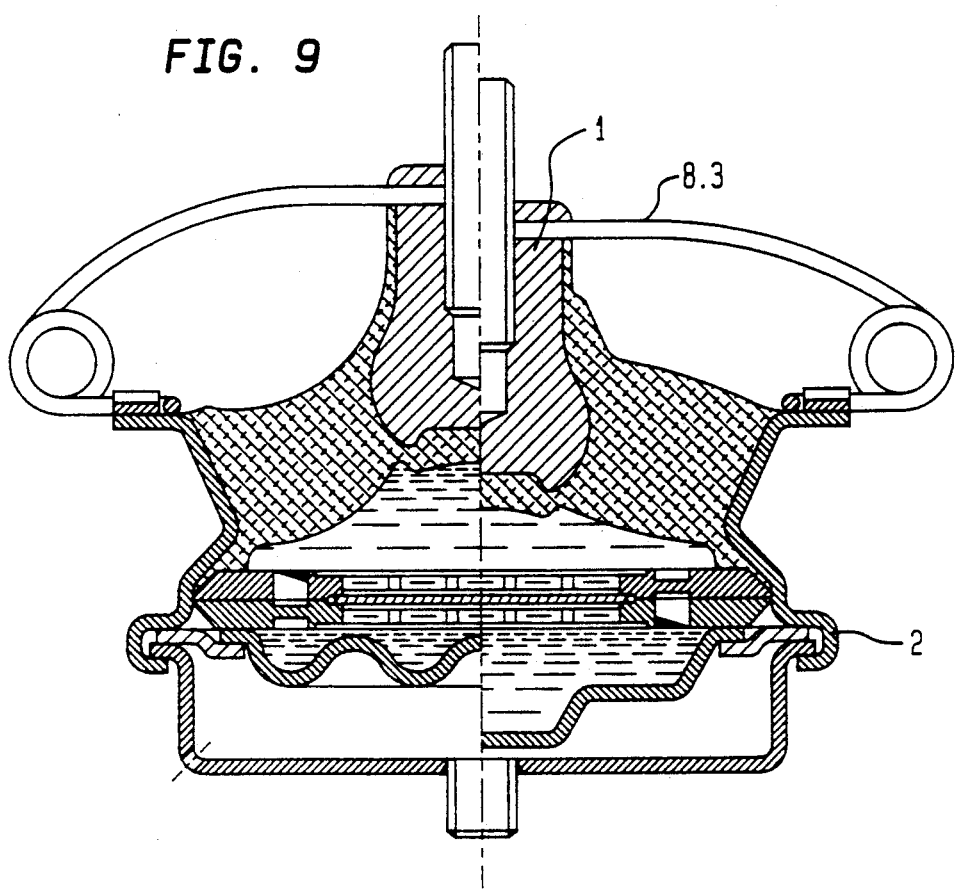
FIGS. 9 and 10 illustrate a further embodiment similar to that of FIGS. 1 and 2 in which hairpin springs are used as relief springs.
Figure 10:
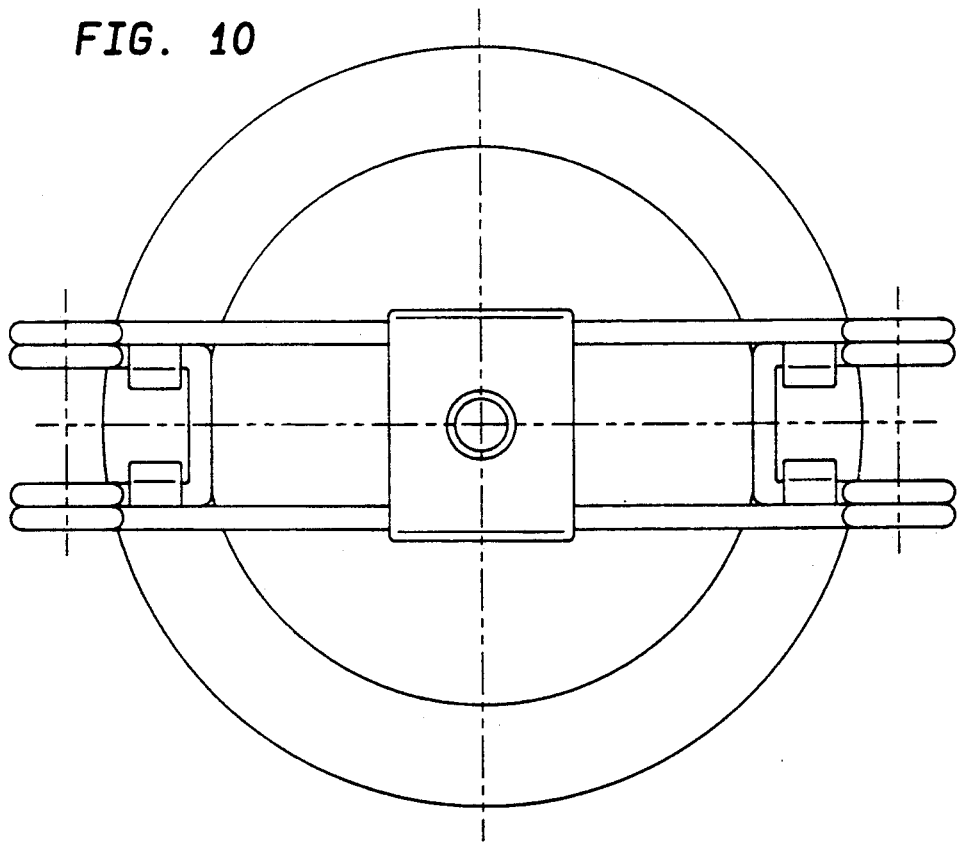

In the embodiment of FIGS. 9 and 10, the relief spring comprises hairpin springs 8.3, which are wound cohesively and are fixed on one side to the bearing member 2 and on the other side to the journal bearing 1. With this design, the available spring excursion is extremely long.

Figure 11:
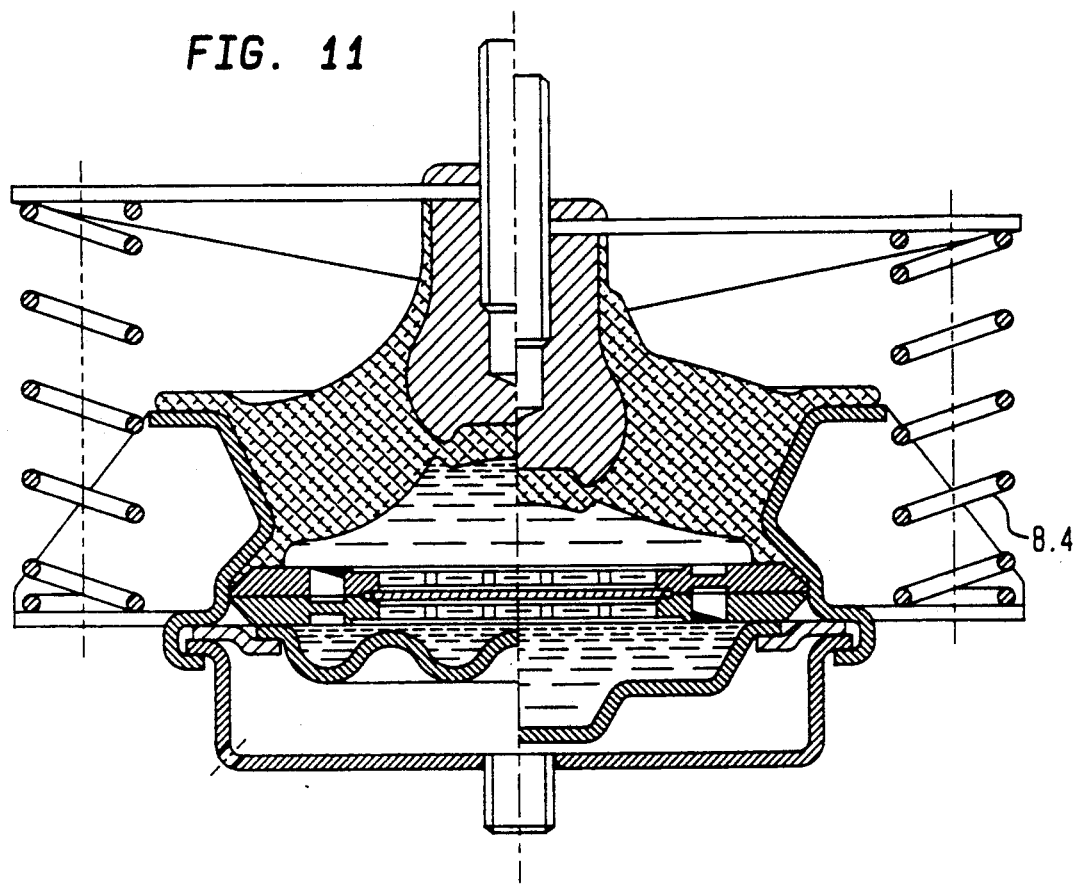
FIGS. 11 and 12 illustrate another embodiment similar to that of FIGS. 1 and 2 in which the relief spring is formed by two helical springs arranged on opposite sides of the rubber bearing.
Figure 12:
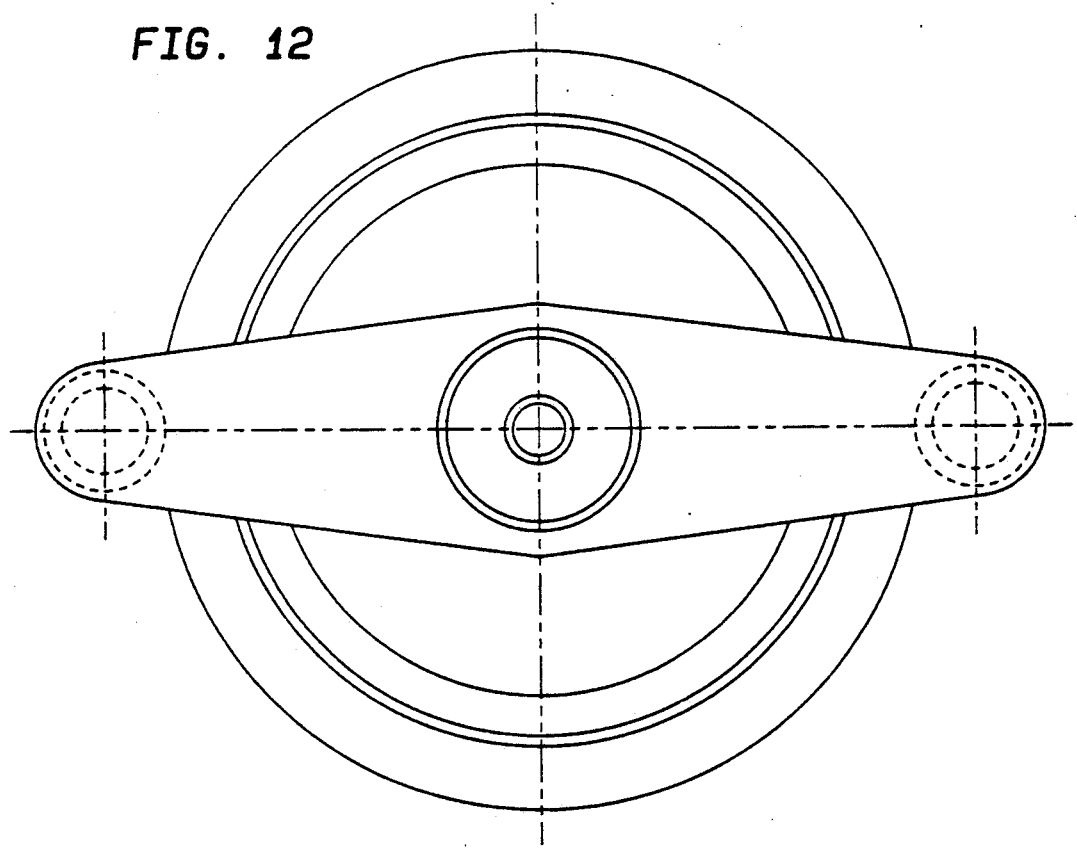

In the embodiment of FIG. 11, the relief spring comprises two oppositely facing helical springs 8.4, which are supported on opposing sides of the rubber bearing between projecting portions of the journal bearing 1 and of the bearing member 2, respectively. With this type of design it is very easy to replace the helical springs 8.4, for example, in case adjustment to loads of different magnitude is required.

Figure 13:
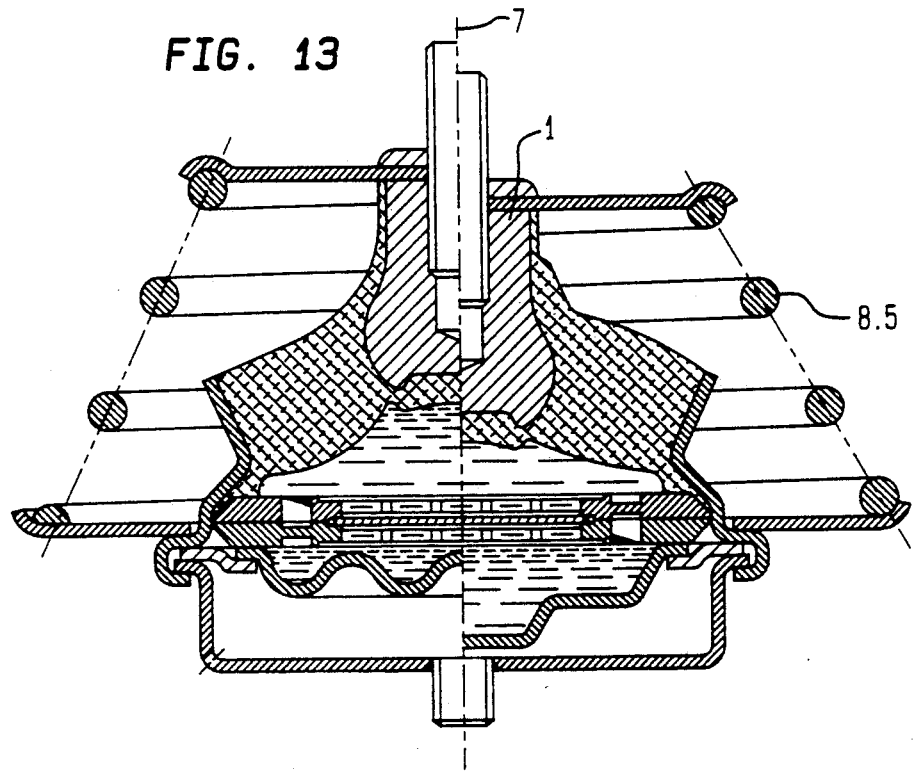
FIGS. 13 and 14 illustrate a rubber bearing similar to the embodiment of FIGS. 1 and 2 in which the relief spring is designed as a conical spiral spring disposed concentric to the axis of motion.
Figure 14:
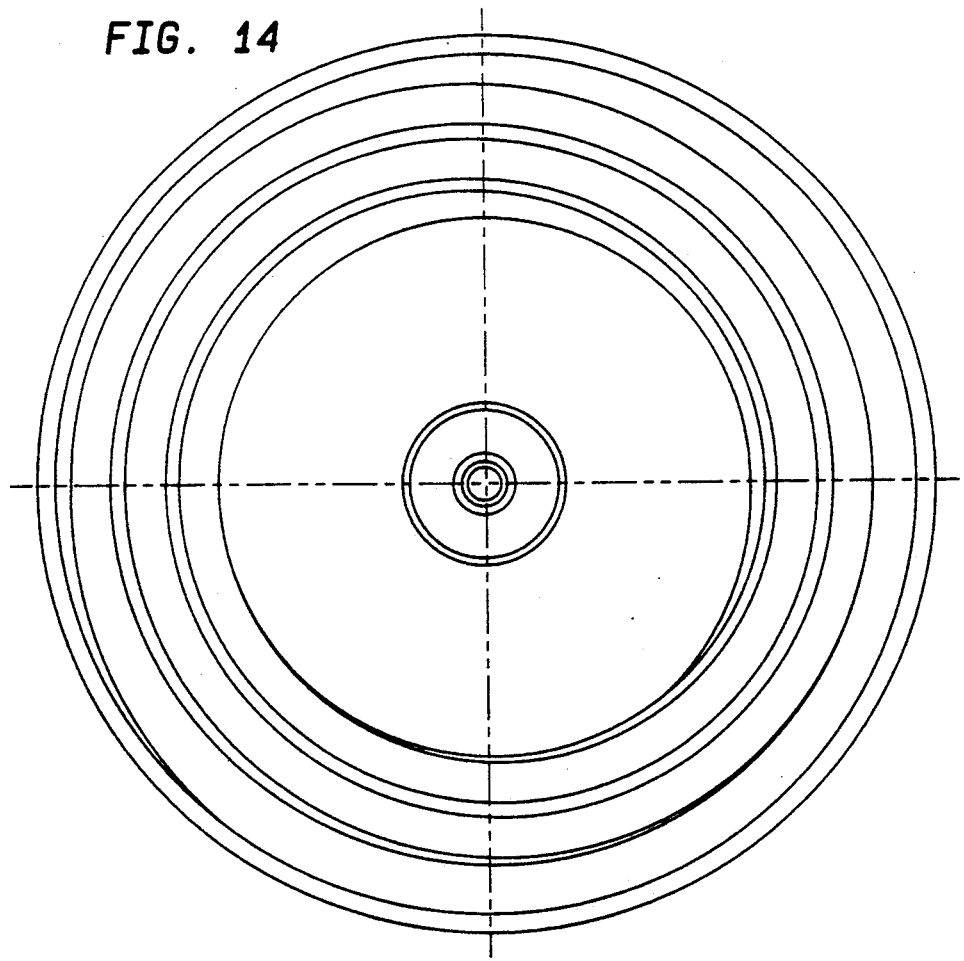

In the embodiment of FIGS. 13 and 14, the relief spring 8 comprises a conical spiral spring 8.5, which is concentric the axis of deformation and surrounds the entire rubber bearing. Spring 8.5 may be supported on annular members projecting from the journal bearing 1 and from the bearing member 2, respectively. In this embodiment, the conical spiral spring 8.5 helps to guide the movement of journal bearing 1 in the perpendicular direction.

Figure 15:
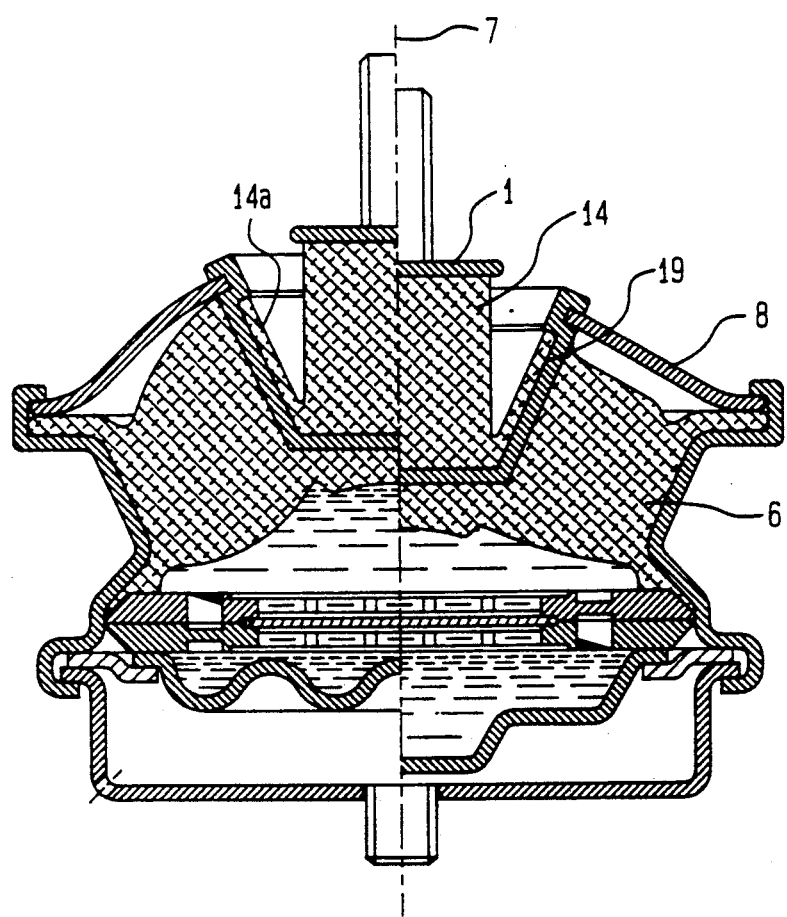
FIG. 15 illustrates an embodiment similar to that of FIG. 1 in which a push spring is provided between the bearing spring and the journal bearing to absorb transverse forces.

In the embodiment of FIG. 15, the relief spring 8 is constructed as a disk spring and, at its radially internal and external areas, is held in U-shaped projections of an intermediate ring 19 and of the bearing member 2, respectively. These projections are dimensioned in such a way that the relative radial movement of at least one of the inner or the outer circumference of the disk spring 8 is not hampered. The bottom side of the intermediate ring 19 is provided with a base, on which the push spring 14 is supported. At the same time, the push spring is fixedly attached to the bottom side of the bearing member 1. The push spring 14 includes an extension 14a spaced from the main body portion of the push spring and diagonally disposed with respect to the deformation axis 7 to abut an inner surface of ring 19. The push spring absorbs transverse movements, which can result from normal operational use or from an asymmetrical positioning of the rubber bearing and one of the machine parts between which the rubber bearing is connected.

What is claimed is:

1. A hydraulically damped rubber bearing comprising:

a journal bearing, a bearing member, and an annular spring element of elastic material forming a bearing spring having a perpendicular axis of deformation, said bearing spring being disposed between said journal bearing and said bearing member;

a fluid-filled working chamber surrounded by said journal bearing, said bearing member, and said bearing spring;

a compensation chamber in fluid communication with said working chamber via a damping port; and at least one relief spring made from a substantially non-creeping or non-setting material having a disk-like annular shape with a generally arcuate shape in profile whose central portion is spaced above the peripheral portion, forming a thermal shield insulating the hydraulically damped rubber bearing from heat, said at least one relief spring being separate from the bearing spring, disposed outside said working and compensation chambers, and having a spring constant such that the relief spring is connected in parallel with the bearing spring to provide a graduated degree of support for said journal bearing on said bearing member when the rubber bearing is normally loaded with a static load.

2. The rubber bearing of claim 1 wherein said at least one relief spring comprises a metal.

3. The rubber bearing of claim 1 wherein said at least one relief spring comprises a fiber-reinforced synthetic resin.

4. The rubber bearing of claim 1 wherein said at least one relief spring is rigidly fixed at one circumferential area to one of the journal bearing and the bearing member and is supported at another circumferential area for radial movement relative to the other of the bearing member and journal bearing when the rubber bearing is loaded.

5. The rubber bearing of claim 4 further comprising a flexible insulating body arranged between the circumferential area supported for radial movement and the other of said journal bearing and bearing member.

6. The rubber bearing of claim 5 wherein said flexible insulating body comprises a rubber.

7. The rubber bearing of claim 1 wherein said bearing spring and said at least one relief spring contact each other in a middle region of their respective radial extents when the rubber bearing is loaded.

8. The rubber bearing of claim 7 wherein several circumferentially spaced places of contact between said bearing spring and said at least one relief spring are provided, said places of contact being formed by projects of one of said bearing spring and said at least one relief spring.

9. The rubber bearing of claim 1 wherein said at least one relief spring comprises a compression spring.

10. The rubber bearing of claim 1 wherein said at least one relief spring has a load-carrying capacity that is at least as great as that of the bearing spring.

11. The rubber bearing of claim 1 wherein the relief spring and the bearing spring are disposed relative to each other in an unloaded condition in such a way that, after a load is applied to the journal bearing, the bearing spring is essentially free of strain.

* * * * *